(12) United States Patent
Becker et al.

(10) Patent No.: US 8,384,914 B2
(45) Date of Patent: Feb. 26, 2013

(54) DEVICE FOR OPTICALLY SCANNING AND MEASURING AN ENVIRONMENT

(75) Inventors: Reinhard Becker, Ludwigsburg (DE); Martin Ossig, Tamm (DE)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/384,806

(22) PCT Filed: Jul. 20, 2010

(86) PCT No.: PCT/IB2010/002226
§ 371 (c)(1), (2), (4) Date: Apr. 16, 2012

(87) PCT Pub. No.: WO2011/010226
PCT Pub. Date: Jan. 27, 2011

(65) Prior Publication Data
US 2012/0188559 A1    Jul. 26, 2012

Related U.S. Application Data

(60) Provisional application No. 61/299,545, filed on Jan. 29, 2010.

(30) Foreign Application Priority Data

Jul. 22, 2009  (DE) .................. 10 2009 035 336

(51) Int. Cl.
  *G01B 11/24*  (2006.01)
(52) U.S. Cl. ... 356/614; 356/4.01; 356/5.01; 356/141.5; 358/505; 358/511; 358/474

(58) Field of Classification Search .......... 356/601–622, 356/4.01, 5.01, 141.5; 358/505, 511, 474–475
See application file for complete search history.

(56) References Cited

U.S. PATENT DOCUMENTS

| | | |
|---|---|---|
| 3,830,567 A | 8/1974 | Riegl |
| 3,899,145 A | 8/1975 | Stephenson |

(Continued)

FOREIGN PATENT DOCUMENTS

| | | |
|---|---|---|
| AU | 2005200937 A1 | 9/2006 |
| CN | 1735789 | 2/2006 |

(Continued)

OTHER PUBLICATIONS

International Search Report of the International Searching Authority for PCT/EP2006/003010; Date of Mailing Nov. 12, 2006.

(Continued)

*Primary Examiner* — Hoa Pham
(74) *Attorney, Agent, or Firm* — Cantor Colburn LLP

(57) ABSTRACT

In a laser scanner for optically scanning and measuring an environment, the scanner having a center which defines for a scan the stationary reference system of the scanner and the center of the scan, a light emitter which emits an emission light beam, a light receiver which receives a reception light beam reflected by an object in the environment of the scanner, a control and evaluation unit which determines, for a multitude of measuring points of the scan, at least the distance between the center of the scan and the object, the scanner, for registering a scene with several scans having different centers, being movable between the centers of the scans, and a scanner mouse for registering the path followed by the scanner between the different centers of the scans, the scanner mouse optically registering the movement of the laser scanner relative to a reference surface.

10 Claims, 3 Drawing Sheets

U.S. PATENT DOCUMENTS

| | | | |
|---|---|---|---|
| 3,945,729 A | 3/1976 | Rosen | |
| 4,733,961 A | 3/1988 | Mooney | |
| 5,218,427 A | 6/1993 | Koch | |
| 5,313,261 A | 5/1994 | Leatham et al. | |
| 5,329,347 A | 7/1994 | Wallace et al. | |
| 5,329,467 A | 7/1994 | Nagamune et al. | |
| 5,402,365 A | 3/1995 | Kozikaro et al. | |
| 5,446,846 A | 8/1995 | Lennartsson | |
| 5,517,297 A | 5/1996 | Stenton | |
| 5,675,326 A | 10/1997 | Juds et al. | |
| 5,745,225 A | 4/1998 | Watanabe et al. | |
| 5,793,993 A | 8/1998 | Broedner et al. | |
| 5,933,267 A | 8/1999 | Ishizuka | |
| 5,940,181 A | 8/1999 | Tsubono et al. | |
| 5,988,862 A | 11/1999 | Kacyra et al. | |
| 6,040,898 A | 3/2000 | Mrosik et al. | |
| 6,069,700 A | 5/2000 | Rudnick et al. | |
| 6,077,306 A | 6/2000 | Metzger et al. | |
| 6,480,270 B1 | 11/2002 | Studnicka et al. | |
| 6,504,602 B1 | 1/2003 | Hinderling | |
| 6,512,575 B1 | 1/2003 | Marchi | |
| 6,675,122 B1 | 1/2004 | Markendorf et al. | |
| 6,710,859 B2 | 3/2004 | Shirai et al. | |
| 6,856,381 B2 | 2/2005 | Christoph | |
| 6,917,415 B2 | 7/2005 | Gogolla et al. | |
| 6,965,843 B2 | 11/2005 | Raab et al. | |
| 7,029,126 B2 | 4/2006 | Tang | |
| 7,076,420 B1 | 7/2006 | Snyder et al. | |
| 7,127,822 B2 | 10/2006 | Kumagai et al. | |
| 7,140,213 B2 | 11/2006 | Feucht et al. | |
| 7,193,690 B2 | 3/2007 | Ossig et al. | |
| 7,285,793 B2 | 10/2007 | Husted | |
| 7,352,446 B2 | 4/2008 | Bridges et al. | |
| 7,430,068 B2 | 9/2008 | Becker et al. | |
| 7,541,830 B2 | 6/2009 | Fahrbach et al. | |
| 7,659,995 B2 | 2/2010 | Knighton et al. | |
| 7,733,544 B2 | 6/2010 | Becker et al. | |
| 7,847,922 B2* | 12/2010 | Gittinger et al. | 356/4.01 |
| 7,869,005 B2* | 1/2011 | Ossig et al. | 356/5.01 |
| 7,935,928 B2 | 5/2011 | Seger et al. | |
| 7,995,834 B1 | 8/2011 | Knighton et al. | |
| 8,064,046 B2* | 11/2011 | Ossig et al. | 356/5.01 |
| 8,152,071 B2 | 4/2012 | Doherty et al. | |
| 2002/0059042 A1 | 5/2002 | Kacyra et al. | |
| 2002/0143506 A1 | 10/2002 | D'Aligny et al. | |
| 2002/0149694 A1 | 10/2002 | Seo | |
| 2003/0043386 A1 | 3/2003 | Froehlich et al. | |
| 2003/0137449 A1 | 7/2003 | Vashisth et al. | |
| 2003/0179361 A1 | 9/2003 | Ohtomo et al. | |
| 2004/0004727 A1 | 1/2004 | Yanagisawa et al. | |
| 2004/0027554 A1 | 2/2004 | Ishinabe et al. | |
| 2004/0068896 A1* | 4/2004 | Sehr | 37/413 |
| 2004/0179570 A1 | 9/2004 | Vitruk et al. | |
| 2004/0221790 A1 | 11/2004 | Sinclair et al. | |
| 2004/0246462 A1 | 12/2004 | Kaneko et al. | |
| 2005/0046823 A1 | 3/2005 | Ando et al. | |
| 2005/0111514 A1 | 5/2005 | Matsumoto et al. | |
| 2005/0141052 A1 | 6/2005 | Becker et al. | |
| 2005/0190384 A1 | 9/2005 | Persi et al. | |
| 2006/0061566 A1 | 3/2006 | Verma et al. | |
| 2006/0088044 A1 | 4/2006 | Hammerl | |
| 2006/0109536 A1 | 5/2006 | Mettenleiter et al. | |
| 2006/0193521 A1 | 8/2006 | England, III et al. | |
| 2006/0245717 A1 | 11/2006 | Ossig et al. | |
| 2007/0058154 A1 | 3/2007 | Reichert et al. | |
| 2007/0064976 A1 | 3/2007 | England, III | |
| 2007/0122250 A1 | 5/2007 | Mullner | |
| 2007/0150111 A1 | 6/2007 | Wu et al. | |
| 2007/0171394 A1 | 7/2007 | Steiner et al. | |
| 2007/0181685 A1 | 8/2007 | Zhu et al. | |
| 2007/0229929 A1 | 10/2007 | Soreide et al. | |
| 2008/0052808 A1 | 3/2008 | Leick et al. | |
| 2008/0151218 A1* | 6/2008 | Mack et al. | 356/5.01 |
| 2008/0273758 A1 | 11/2008 | Fuchs et al. | |
| 2008/0309546 A1 | 12/2008 | Wakayama et al. | |
| 2009/0046752 A1 | 2/2009 | Bueche et al. | |
| 2009/0095047 A1 | 4/2009 | Patel et al. | |
| 2009/0100949 A1 | 4/2009 | Shirai et al. | |
| 2009/0133494 A1 | 5/2009 | Van Dam et al. | |
| 2009/0161091 A1 | 6/2009 | Yamamoto | |
| 2009/0323742 A1 | 12/2009 | Kumano | |
| 2010/0030421 A1 | 2/2010 | Yoshimura et al. | |
| 2010/0049891 A1 | 2/2010 | Hartwich et al. | |
| 2010/0134596 A1* | 6/2010 | Becker | 348/47 |
| 2010/0195086 A1 | 8/2010 | Ossig et al. | |
| 2011/0066781 A1 | 3/2011 | Debelak et al. | |
| 2012/0019806 A1* | 1/2012 | Becker et al. | 356/4.01 |
| 2012/0033069 A1* | 2/2012 | Becker et al. | 348/135 |
| 2012/0069325 A1* | 3/2012 | Schumann et al. | 356/51 |
| 2012/0069352 A1* | 3/2012 | Ossig et al. | 356/607 |
| 2012/0070077 A1* | 3/2012 | Ossig et al. | 382/164 |
| 2012/0133953 A1* | 5/2012 | Ossig et al. | 356/601 |
| 2012/0140244 A1* | 6/2012 | Gittinger et al. | 356/612 |

FOREIGN PATENT DOCUMENTS

| | | |
|---|---|---|
| DE | 2216765 A1 | 4/1972 |
| DE | 3227980 A1 | 5/1983 |
| DE | 3340317 A1 | 8/1984 |
| DE | 4027990 C1 | 2/1992 |
| DE | 4222642 A1 | 1/1994 |
| DE | 4340756 A1 | 6/1994 |
| DE | 4303804 A1 | 8/1994 |
| DE | 4445464 A1 | 7/1995 |
| DE | 19601875 A1 | 7/1997 |
| DE | 19607345 A1 | 8/1997 |
| DE | 19811550 A1 | 9/1999 |
| DE | 19850118 A1 | 5/2000 |
| DE | 19928958 A1 | 11/2000 |
| DE | 20208077 U1 | 5/2002 |
| DE | 10137241 A1 | 9/2002 |
| DE | 10232028 | 2/2004 |
| DE | 10336458 A1 | 2/2004 |
| DE | 10244643 A1 | 4/2004 |
| DE | 20320216 U1 | 4/2004 |
| DE | 10304188 A1 | 8/2004 |
| DE | 10361870 A | 7/2005 |
| DE | 102004028090 A1 | 12/2005 |
| DE | 202006005643 U1 | 8/2006 |
| DE | 102005056265 A1 | 5/2007 |
| DE | 102006053611 A1 | 5/2007 |
| DE | 102006024534 A1 | 11/2007 |
| DE | 102008014274 A1 | 8/2009 |
| DE | 102009035336 B3 | 11/2010 |
| EP | 0949524 A1 | 10/1999 |
| EP | 1056987 A1 | 6/2000 |
| EP | 1310764 A2 | 5/2003 |
| EP | 1342989 A2 | 9/2003 |
| EP | 1347267 A1 | 9/2003 |
| EP | 1528410 A1 | 5/2005 |
| GB | 2336493 A | 10/1999 |
| GB | 2388661 A | 11/2003 |
| GB | 2447258 A | 9/2008 |
| JP | 2003156330 A | 5/2003 |
| JP | 2004109106 A | 4/2004 |
| WO | 89/05512 | 6/1989 |
| WO | 97/11399 | 3/1997 |
| WO | 0020880 A2 | 4/2000 |
| WO | 0063645 | 10/2000 |
| WO | 0063681 A2 | 10/2000 |
| WO | 2005008271 A2 | 1/2005 |
| WO | 2005059473 A2 | 6/2005 |
| WO | 2006000552 A1 | 1/2006 |
| WO | 2006053837 A1 | 5/2006 |
| WO | 2007012198 A1 | 2/2007 |
| WO | 2007051972 A1 | 5/2007 |
| WO | 2007087198 A1 | 8/2007 |
| WO | 2008048424 A2 | 4/2008 |
| WO | 2008068791 A1 | 6/2008 |
| WO | 2009053085 A1 | 4/2009 |
| WO | 2009095384 A2 | 8/2009 |
| WO | 2010108644 A9 | 9/2010 |
| WO | 2011021103 A1 | 2/2011 |

OTHER PUBLICATIONS

International Search Report of the International Searching Authority for PCT/EP2010/001779; Date of Mailing Jul. 20, 2010.

International Search Report for International Patent Application PCT/EP2010/001780; mailing date Jul. 23, 2010.
International Search Report of the International Searching Authority for PCT/EP2010/001781; Date of Mailing Jul. 22, 2010.
International Search Report of the International Searching Authority for PCT/IB2010/002258; Date of Mailing Jan. 28, 2011.
International Search Report of the International Searching Authority for PCT/EP2009/050888; Date of Mailing Sep. 15, 2009.
International Search Report of the International Searching Authority for PCT/EP2010/006866; Date of Mailing Mar. 14, 2011.
International Search Report of the International Searching Authority for PCT/EP2010/006868; Date of Mailing Mar. 14, 2011.
International Search Report of the International Searching Authority for PCT/IB2010/002216; Date of Mailing Feb. 3, 2011.
International Search Report of the International Searching Authority for PCT/EP2009/050887; Date of Mailing May 14, 2009.
Jasiobedzki, Piotr, "Laser Eye—A New 3D Sensor for Active Vision", SPIE—Sensor Fusion VI, vol. 2059, Sep. 7, 1993, pp. 316-321, XP00262856, Boston, U.S.A., Retrieved from the Internet: URL:http://scitation.aip.org/getpdf/servlet/GetPDFServlet?filetype=pdf&id=PSISDG002059000001000316000001&idtype=cvips&doi=10.117/12.150236&prog=normal>[retrieved on Mar. 8, 2011] the whole document.
Umeda, K., et al., Registration of Range and Color Images Using Gradient Constraints and Ran Intensity Images, Proceedings of the 17th International Conference onPatern Recognition (ICPR'04), Copyright 2010 IEEE. [Retrieved online Jan. 28, 2010—IEEE Xplore].
Williams, J.A., et al., Evaluation of a Novel Multiple Point Set Registration Algorithm, Copyright 2000, [Retrieved on Jan. 18, 2010 at 04:10 from IEEE Xplore].
Written Opinion of the International Searching Authority for International Patent Application PCT/EP2010/006867; mailing date Mar. 18, 2011.
WO 00/26612 is the published equivalent of DE 19850118. Published May 11, 2000.
AKCA, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DOI:10.3929/ethz-a-004656666.
Bornaz, L., et al., Multiple Scan Registration in Lidar Close-Range Applications, The International Archives of the Photogrammetry, Remote Sensing and Spatial Information Sciences, vol. XXXIV, Part 5/W12, Jul. 2003, pp. 72-77, XP002590306.
Chinese Office Action Dated Jun. 2, 2010 with English Translation of the Text for Application No. 2006800540959.
Chinese Publication No. CN 1445509, published Oct. 1, 2003—English Abstract Not Available; EP Equivalent 1347267.
Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998, Nov. 3, 1998 pp. 343-354, XP002587995, Proceedings of the SPIE.
Godin, G., et al., A Method for the Registration of Attributed Range Images, Copyright 2001, [Retrieved on Jan. 18, 2010 at 03:29 from IEEE Xplore].
International Preliminary Report on Patentability and Written Opinion for International Application No. PCT/EP2007/005789; Date of Mailing Oct. 30, 2007.
International Preliminary Report on Patentability and Written Opinion for PCT/IB2010/002216; Date of Issuance Jan. 24, 2012.
International Preliminary Report on Patentability and Written Opinion for PCT/EP2009/050887; Date of Issue Sep. 7, 2010.
International Preliminary Report on Patentability and Written Opinion for PCT/IB2010/002226; Date of Issuance Jan. 24, 2012.
International Preliminary Report on Patentability and Written Opinion for PCT/EP2004/014605; Date of Issue Aug. 29, 2006.
iQsun Laserscanner Brochure, 2 pages, Apr. 2005.
International Preliminary Report on Patentability and Written Opinion for PCT/EP2009/050888; Date of Issuance Sep. 7, 2010.
International Search Report and Written Opinion of the International Searching Authority for PCT/EP2009/009174; Date of Mailing May 25, 2010.
International Search Report of the International Seraching Authority forPCT/EP2010/006867; Date of Mailing Mar. 18, 2011.
International Search Report of the International Searching Authority for PCT/EP2007/005789; Date of Mailing Oct. 30, 2007.
International Search Report and Written Opinion for International Patent Application PCT/IB2010/002226; mailing date Dec. 13, 2010.
International Search Report of the International Searching Authority for PCT/EP2004/014605; Date of Mailing Apr. 15, 2005.
Bouvet, D., et al., "Precise 3-D Localization by Automatic Laser Theodolite and Odometer for Civil-Engineering Machines", Proceedings of the 2001 IEEE International Conference on Robotics and Automation. ICRA 2001. Seoul, Korea, May 21-26, 2001; IEEE, US., vol. 2, May 21, 2001, pp. 2045-2050, XP010550445, DOI: 10.1109/ROBOT.2001.932908 ISBN: 978-0-7803-6576-6, the whole document.
International Search Report of the International Searching Authority for Application No. PCT/EP2011/003261; Date of Mailing Oct. 17, 2011.
International Search Report of the International Searching Authority for Application No. PCT/EP2011/003263; Date of Mailing Oct. 19, 2011.
International Search Report of the International Searching Authority for Application No. PCT/EP2011/003264; Date of Mailing Oct. 19, 2011.
Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf [retrieved on Oct. 5, 2011] the whole document.
International Search Report of the International Searching Authority for Application No. PCT/EP2011/001662; Date of Mailing May 26, 2011.
Written Opinion of the International Searching Authority for Application No. PCT/EP2011/001662; Date of Mailing May 26, 2011.
Brenneke, C., et al., "Using 3D Laser Range Data for Slam in Outdoor Environments", Proceedings of the 2003 IEEE/RSJ International Conference on Intelligent Robots and Systems. (IROS 2003); Las Vegas, NV, Oct. 27-31, 2003; [IEEE/RSJ International Conference on Intelligent Robots and Systems], New York, NY: IEEE, US, vol. 1, Oct. 27, 2003; pp. 188-193, XP010672337, DOI:10.1109/Iros.2003.1250626; ISBN: 978-0-7803-7860-5, p. 189; Figure 1.
International Search Report for International Patent Application PCT/IB2010/002226; mailing date Dec. 13, 2010.
Written Opinion of the International Searching Authority for International Patent Application PCT/IB2010/002226; mailing date Dec. 13, 2010.
14th International Forensic Science Symposium, Interpol—Lyon, France, Oct. 19-22, 2004, Review Papers, Edited by Dr. Niamh Nic Daeid, Forensic Science Unit, Univeristy of Strathclyde, Glasgow, UK.
Ingensand, H., Dr., "Introduction to Geodetic Metrology", "Einfuhrung in die Geodatische Messtechnik", Federal Institute of Technology Zurich, Edition 2004, p. 16.
FARO Laserscanner LS, Presentation Forensic Package, Policeschool of Hessen, Wiesbaden, Germany, Dec. 14, 2005; FARO Technologies, Copyright 2008.
FARO Laser Scanner LS, Recording Reality's Digital Fingerprint, The Measure of Success, Copyright 2005.
Haag, et al., "Technical Overview and Application of 3D Laser Scanning for Shooting Reconstruction and Crime Scene Investigations", Presented at the American Academy of Forensic Sciences Scientific Meeting, Washington, D.C., Feb. 21, 2008.
Howard, et al., "Virtual Environments for Scene of Crime Reconstruction and Analysis", Advanced Interfaces Group, Department of Computer Science, University of Manchester, Manchester, UK, Feb. 28, 2000.
International Preliminary Report on Patentability and Written Opinion for PCT/EP2010/001779; Date of Issuance Sep. 27, 2011.
International Preliminary Report on Patentability and Written Opinion for PCT/IB2010/002258; Date of Issuance Feb. 21, 2012.

International Preliminary Report on Patentability and Written Opinion for PCT/EP2010/006866; Date of Issuance May 22, 2012.

International Preliminary Report on Patentability and Written Opinion for PCT/EP2010/006867; Date of Issuance May 22, 2012.

International Preliminary Report on Patentability and Written Opinion for PCT/EP2010/001780; Date of Issuance Sep. 27, 2011.

International Preliminary Report on Patentability and Written Opinion for PCT/EP2010/001781; Date of Issuance Sep. 27, 2011.

International Preliminary Report on Patentability and Written Opinion for PCT/EP2010/006868; Date of Issuance May 22, 2012.

International Preliminary Report on Patentability and Written Opinion for PCT/EP2009/009174; Date of Issuance Aug. 16, 2011.

Leica Geosystems TruStory Forensic Analysis by Albuquerque Police Department, 2006.

Langford, et al., "Practical Skills in Forensic Science", Pearson Education Limited, Essex, England, First Published 2005, Forensic Chemistry.

Huebner, S.F., "Sniper Shooting Tecnhique", "Scharfschutzen Schiebtechnik", Copyright by C.A. Civil Arms Verlag GmbH, Lichtenwald 1989, Alle Rechte vorbehalten, pp. 11-17.

Se, et al., "Instant Scene Modeler for Crime Scene Reconstruction", MDA, Space Missions, Ontario, Canada, Copyright 2005, IEEE.

The Scene, Journal of The Association for Crime Scene Reconstruction, Apr.-Jun. 2006, vol. 12, Issue 2.

Written Opinion of the International Searching Authority for Application No. PCT/EP2006/003010; Date of Mailing Dec. 11, 2006.

Chinese Notification of First Office Action for Chinese Application No. 201080003463.3; Issued Oct. 30, 2012 (translated).

Merriam-Webster (m-w.com), "Interface". 2012. http://www.merriam-webster.com/dictionary/interface.

Merriam-Webster (m-w.com), "Traverse". 2012. http://www.merriam-webster.com/dictionary/traverse.

Merriam-Webster (m-w.com), "Parts". 2012. http://www.merriam-webster.com/dictionary/parts.

* cited by examiner

DEVICE FOR OPTICALLY SCANNING AND MEASURING AN ENVIRONMENT

CROSS-REFERENCE TO RELATED APPLICATIONS

The present application is a National Stage Application of PCT Application No. PCT/IB2010/002226 filed on Jul. 20, 2010, which claims the benefit of U.S. Provisional Patent Application No. 61/299,545 filed on Jan. 29, 2010, and of pending German Patent Application No. DE 10 2009 035 336.4, filed on Jul. 22, 2009, and which are hereby incorporated by reference.

BACKGROUND OF THE INVENTION

The invention relates to a device for optically scanning and measuring an environment.

By a device such as is known for example from U.S. Published Patent Application No. 2010/0134596, and which is designed as a laser scanner, the environment of the laser scanner can be optically scanned and measured. If a scene shall be taken by several scans which are joined together by different targets, the center of the corresponding scan can be approximately determined by a Global Positioning System (GPS), so that the targets in the scans can be clearly localized and identified. It is a problem that this method fails in closed halls.

SUMMARY OF THE INVENTION

Embodiments of the present invention are based on the object of improving a device mentioned hereinabove.

The position of the laser scanner is changed between the scans. In place of the path followed by the laser scanner from the old center to the new center, the path of a reference point of the laser scanner, for example of a base, which reference point is stationary with regard to the scanning process, can be considered. The device according to embodiments of the invention makes it possible to trace, at least approximately, this path, i.e. the difference vector between the old center and the new center. The scans made for this purpose can then be joined together (registered) more easily, since the targets contained in the scans, the positions of which targets can be estimated well when knowing the path followed, can be localized and identified more easily. Knowledge of the approximate position is sufficient, since, by image processing, deviations can be corrected, up to a certain value. The path is traced by an optical measuring device, wherein other measuring methods and devices can be combined with the optical device, for example an inertial sensor, as is known from navigation. The notion "reference surface" shall not be limited herein to exactly defined surfaces of determined three-dimensional objects, but also scenes with areas which, for example, reach up to the horizon, shall be understood hereunder. The scanner mouse may be in contact with the reference surface.

The laser scanner can be moved relatively easily by a carriage. It is also possible to freely move the laser scanner, i.e. to transport the scanner manually from the old center to the new center. The movement of the laser scanner and/or the scanner mouse can take place in any direction relative to the reference surface, i.e. show parallel and normal components. The scanner mouse may be in fixed connection with the laser scanner, e.g., the scanner mouse can be mounted on the laser scanner, on a carriage or on a stand.

The scanner mouse may be configured as an optical computer mouse, i.e. for registering the movement of the laser scanner as a whole (i.e., movement of the entire laser scanner device), the scanner mouse determines the optical flow. The scanner mouse may comprise a light source, for example an LED or a laser, which emits light onto the reference surface, a sensor with spatial resolution, for example, a camera, which, at regular intervals, takes data from the irradiated reference surface, for example, pictures, and a computing unit which compares the pictures which have been taken with each other and which, by way of the differences between the pictures, computes the movement of the scanner mouse relative to the reference surface. For this purpose, the computing unit may determine the optical flow, i.e. a speed vector field of the pixels. The computer-mouse technology provides a short distance focusing. The scanner mouse needs a longer focal length. Therefore, the scanner mouse is provided with at least one (or several) (optical) element(s), which replace the computer-mouse lens. The scanner mouse and its (optical) element(s) may be mounted on the laser scanner. In the simplest case, if the reference surface is illuminated relatively well, the scanner mouse may comprise the sensor without a light source. The evaluation of its data can also take place in an existing evaluation unit.

The data of the laser scanner and of its scanner mouse are joined together for evaluation, particularly for linking. For this purpose, the scanner mouse, during the scans, can be connected, for example, continuously, or after every or after all scans, to the control and evaluation unit, for example by a cable with a defined interface or by a radio (i.e., wireless). It is, however, also possible to join together the data for evaluation, particularly for linking, only after the whole scene has been registered, i.e. after all scans have been made, for example in an external evaluation unit, which can be a separate computer. An initial synchronization facilitates linking. The data of the scanner mouse can be stored also in a data memory which, instead of the scanner mouse, can be connected to the evaluation unit.

The laser scanner can comprise several scanner mice, which might be orientated in different directions. The data of these scanner mice, particularly optical flows, are then joined together and evaluated, if necessary with the data of further measuring devices. Alternatively, the scanner mouse is provided with an omnidirectional camera (e.g. fisheye).

BRIEF DESCRIPTION OF THE DRAWINGS

The invention is explained in more detail below on the basis of an exemplary embodiment illustrated in the drawing, in which.

DETAILED DESCRIPTION OF THE INVENTION

Figure 1:
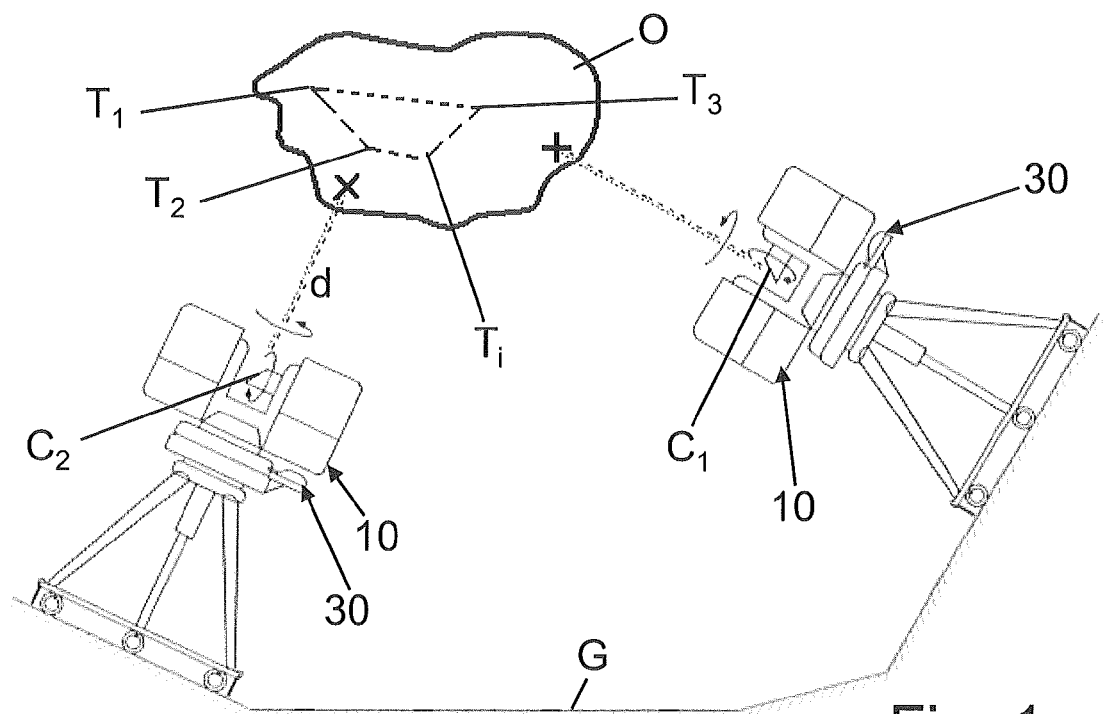
FIG. 1 is a schematic illustration of the registering of a scene with several scans by differently positioned laser scanners.
Figure 2:
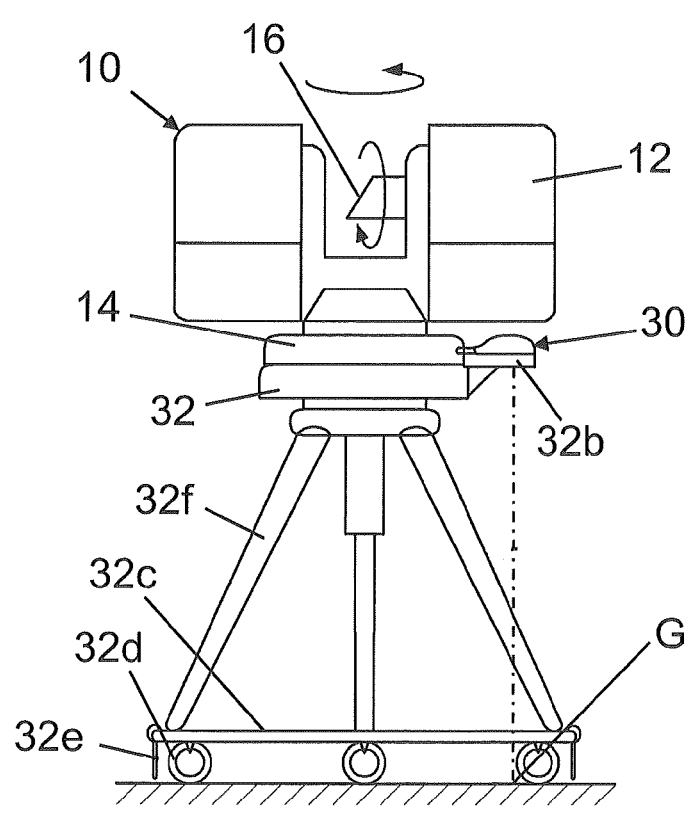
FIG. 2 is a schematic illustration of a laser scanner of FIG. 1 with a scanner mouse mounted on a carriage.
Figure 4:
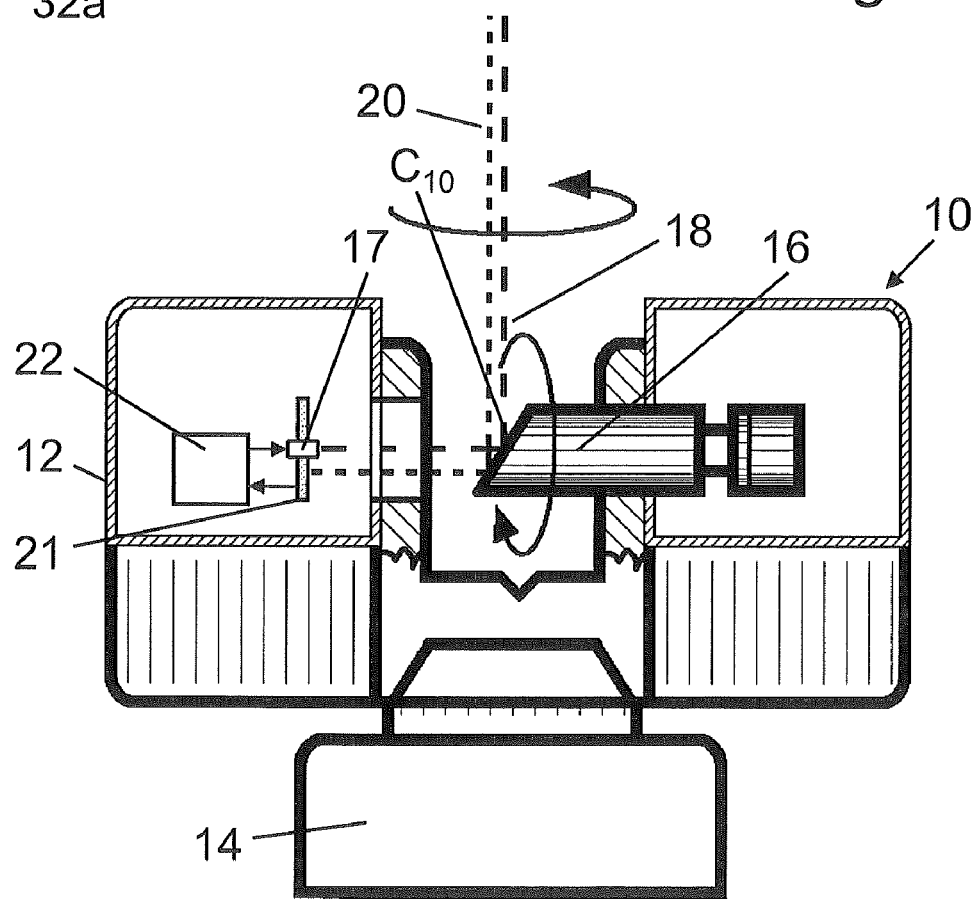
FIG. 4 is a partially sectioned illustration of the laser scanner of FIG. 1.

Referring to FIGS. 2 and 4, a laser scanner 10 is provided as a device for optically scanning and measuring the environment of the laser scanner 10. The laser scanner 10 has a measuring head 12 and a base 14. The measuring head 12 is mounted on the base 14 as a unit that can be rotated about a vertical axis. The measuring head 12 has a mirror 16, which can be rotated about a horizontal axis. The intersection point of the two rotational axes is designated as the center $C_{10}$ of the laser scanner 10.

Referring to FIG. 4, the measuring head 12 is further provided with a light emitter 17 for emitting an emission light beam 18. The emission light beam 18 may be a laser beam in the visible range of approximately 340 to 1600 nm wave length, for example 790 nm; however, other electro-magnetic waves having, for example, a greater wave length can be used. The emission light beam 18 is amplitude-modulated, for example with a sinusoidal or with a rectangular-waveform modulation signal. The emission light beam 18 is emitted by the light emitter 17 onto the mirror 16, where it is deflected and emitted to the environment. A reception light beam 20 which is reflected in the environment by an object O or scattered otherwise, is captured by the mirror 16, deflected and directed onto a light receiver 21. The direction of the emission light beam 18 and of the reception light beam 20 results from the angular positions of the mirror 16 and the measuring head 12, which depend on the positions of their corresponding rotary drives which, in turn, are registered by one encoder each. A control and evaluation unit 22 has a data connection to the light emitter 17 and to the light receiver 21 in measuring head 12, whereby parts of the control and evaluation unit 22 can be arranged also outside the measuring head 12, for example a computer connected to the base 14. The control and evaluation unit 22 determines, for a multitude of measuring points X, the distance d between the laser scanner 10 and the illuminated point at object O, from the propagation time of emission light beam 18 and reception light beam 20. For this purpose, the phase shift between the two light beams 18 and 20 is determined and evaluated.

Scanning takes place along a circle by means of the relatively quick rotation of the mirror 16. By virtue of the relatively slow rotation of the measuring head 12 relative to the base 14, the whole or entire space is scanned step by step, by way of the circles. The entity of measuring points X of such a measurement is designated a scan. For such a scan, the center $C_{10}$ of the laser scanner 10 defines the stationary reference system of the laser scanner 10, in which the base 14 rests. Further details of the laser scanner 10 and particularly of the design of measuring head 12 are described for example in U.S. Pat. No. 7,430,068 and U.S. Published Patent Application No. 2010/0134596, the contents of which are incorporated by reference.

A scan of a certain scene is made by optically scanning and measuring the environment of the laser scanner 10. Scenes, which cannot be registered with one single scan, such as labyrinthine framework structures or objects O with many undercuts, are possible. For this purpose, the laser scanner 10 is set up at different positions, i.e. the center $C_{10}$ of the laser scanner 10 defines different centers $C_i$ (for each scan a certain center $C_i$, which corresponds to the center $C_{10}$ of the laser scanner 10), and scanning and measuring is repeated, i.e. each scan is made with a defined center $C_i$, which always registers the same scene, but from a different viewing angle. The different scans of the same scene are registered in a common coordinate system, which is designated registering (visual registering).

Before a scan is made, several targets $T_1, T_2 \ldots$, i.e. special objects O can be suspended in the environment. The laser scanner 10 is then set up in a new position for several times, i.e. a new center $C_i$ is defined, and a scan is made for each position. The whole scene is then registered by several scans having different centers $C_1, C_2$. Adjacent scans overlap so that several (preferably at least three) targets $T_1, T_2 \ldots$ are registered by two adjacent scans each. Spheres and checker-board patterns have turned out to be particularly suitable (and therefore preferred) targets. The targets $T_1, T_2 \ldots$ can then be localized and identified in the scans. Instead of using targets $T_1, T_2 \ldots$, the scans can be joined together also in another manner.

Figure 3:
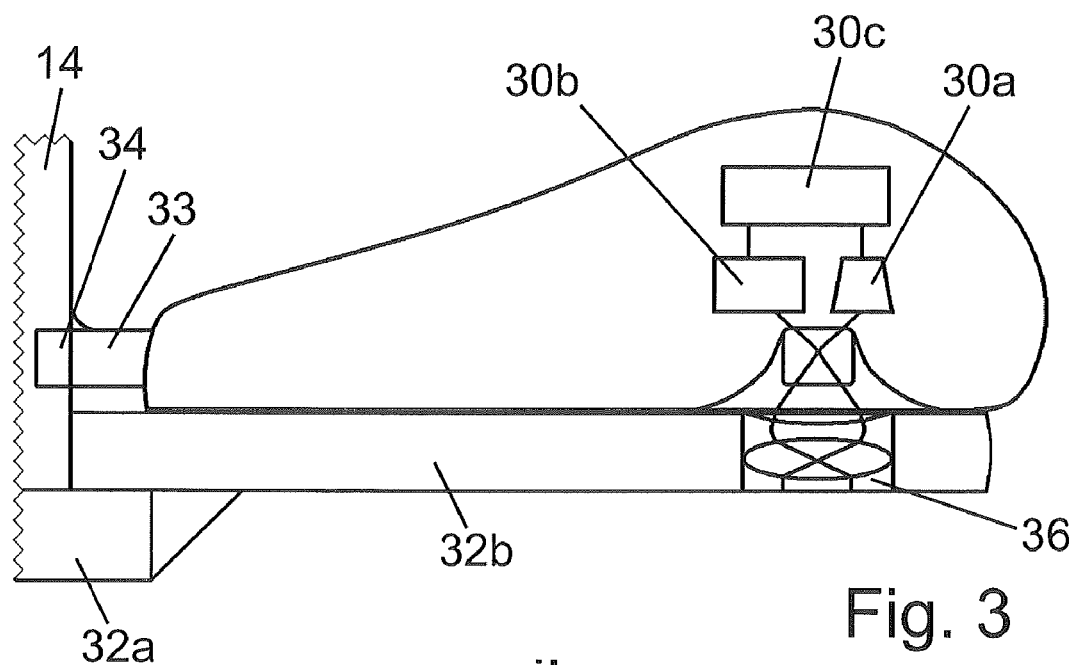
FIG. 3 is a detailed illustration of a scanner mouse connected to the laser scanner of FIG. 1.

Referring to FIGS. 3 and 4, according to embodiments of the invention, an optical measuring device, in the following designated scanner mouse 30, is provided. The scanner mouse 30 registers the path followed by the laser scanner 10 (difference vector) between different centers $C_1, C_2$. For this purpose, the laser scanner 10 is mounted on a carriage 32, for example with its base 14 connected to a mounting device 32a of the carriage. The scanner mouse associated to the laser scanner 10 is orientated towards a reference surface G, for example, the floor, wherein it may also bear against the reference surface G. The scanner mouse 30 is carried along by the carriage 32. It can be mounted (non-releasably) on the carriage 32, in an embodiment on a mouse carrier 32b of the mounting device 32a. The scanner mouse 30 can also be a permanent component of the laser scanner 10, for example be mounted on the base 14 or on the measuring head 12.

In embodiments of the present invention, the scanner mouse 30 is designed with the known technology of an optical computer mouse, i.e. the scanner mouse 30 comprises a light source 30a, for example an LED or a laser which emits light onto the reference surface G, a sensor 30b designed as a camera, which takes data (i.e. pictures) of the irradiated reference surface G at regular intervals, and a computing unit 30c which compares the taken pictures with each other and, by way of the differences, computes the movement of the scanner mouse 30 relative to the reference surface G. For this purpose, the computing unit 30c determines the optical flow from the taken pictures. These elements 30a, 30b, 30c may be mounted on a common printed circuit board or integrated in a common module. By a cable 33 (or by radio—wireless communication), the computed positions of the scanner mouse 30 are then transmitted to the control and evaluation unit 22, to which the scanner mouse 30 is connected during the scan or after all scans have been made. For this purpose, the laser scanner 10 comprises an interface 34 (for example USB, PS/2 or an interface, which is defined by the manufacturer of the laser scanner). The interface 34 may be provided on the base 14 and can be physically integrated therein. Additionally or alternatively to the connection to the control and evaluation unit 22, the scanner mouse 30 comprises a data memory, for example as part of the computing unit 30c, where the data of the scanner mouse 30 are stored. The scanner mouse 30 and/or its data memory can also be (later) connected to an external evaluation device, particularly after registering of the complete scene.

The technology of the optical computer mouse provides a relatively short distance between the computer mouse and reference surface G. As the scanner mouse 30 is mounted on the carriage 32, the distance of the scanner mouse 30 to the floor is normally too long for the focal length of an optical computer mouse. Therefore, instead of the computer mouse lens (or in addition to the computer mouse lens), the scanner mouse 30 is provided with at least one optical element 36, or several optical elements 36, such as lenses and/or optical-fiber cables, defining the focal length of the scanner mouse 30 and providing a close-up of the reference surface G. Such an optical element 36 may be integrated in the scanner mouse 30 directly, in the base 14, or in the mouse carrier 32b of the carriage 32. In the present embodiment as shown in FIG. 2, the carriage 32 comprises a three-armed under-carriage 32c, with three rollers 32d and three adjustable struts 32e, and a tripod 32f being mounted on the under-carriage 32c. The scanner mouse 30 and the optical element 36 are mounted on the mouse carrier 32b of the carriage 32, next to the base 14, and the optical element 36 is focusing to the floor, i.e. the reference surface G, in between two arms of the under-carriage 32c. During the scan, the struts 32e touch the floor. During the move of the carriage 32, the struts 32e are retracted.

For clearly synchronizing the targets $T_1, T_2 \ldots$ during picture-processing of the different scans, it is sufficient, if the scanner mouse 30 only approximately registers the path followed by the laser scanner 10, e.g. the relative values of the path without exact absolute values of the path. The start-up phase and the deceleration phase of the carriage 32 may remain unconsidered. For this purpose, the data of the scanner mouse 30, which are assigned to these phases, are ignored, for example by a threshold value for acceleration, or they are averaged.

Figure 5:
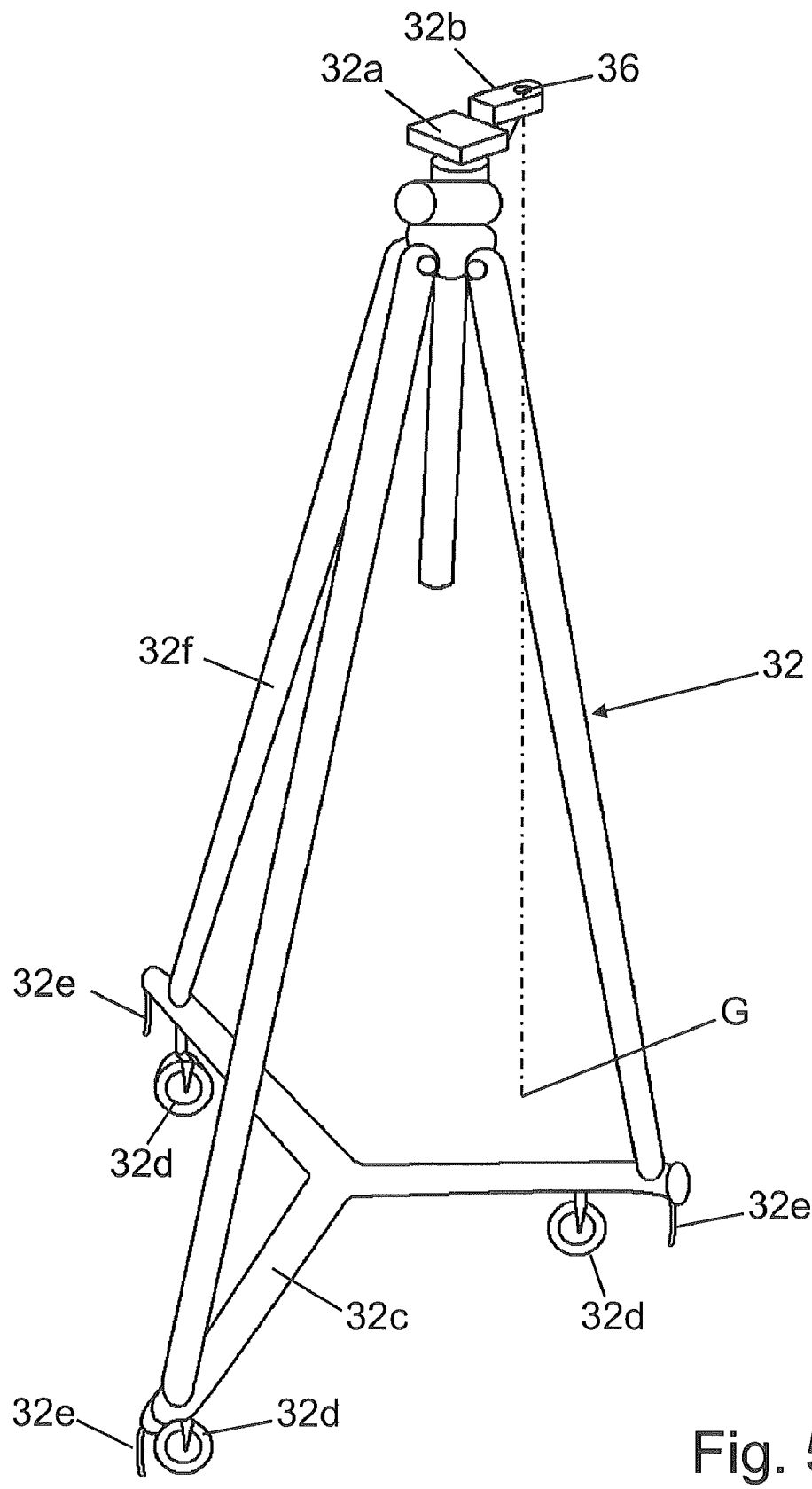
FIG. 5 is an illustration of a carriage connected with the laser scanner of FIG. 1.

Referring to FIG. 5, instead of being mounted on a carriage 32, the base 14 can also be mounted on a stand which may be configured as a tripod, and which is then transported manually. Unless the scanner mouse 30 is already mounted on the base 14, the scanner mouse 30 can be carried along in the same way with the stand on which it can be mounted, for example together with an additional optical element 36. Optionally, a leveling device, for example with spirit levels and setting screws, is provided between the base 14 and the stand (or the carriage 32).

The invention claimed is:

1. Device for optically scanning and measuring an environment, which device is designed as a laser scanner, having a center, which defines for a scan the stationary reference system of the laser scanner and the center of this scan, a base, a measuring head which is rotatable relative to the base, a light emitter which is comprised by the measuring head and which emits an emission light beam, a light receiver, which is comprised by the measuring head and which receives a reception light beam being reflected by an object in the environment of the laser scanner or scattered otherwise, a control and evaluation unit which, for a multitude of measuring points of the scan, determines at least the distance between the center and the object, wherein the laser scanner for registering a scene with scans having several, different centers, is movable as a whole between the different centers, characterized in that an optical measuring device is provided for registering the path followed by the laser scanner as a whole between the different centers, the optical measuring device registering its movement, as a whole, relative to a reference surface by means of determination of the optical flow, wherein the optical measuring device is mounted on the base or on the measuring head or on a carriage, by means of which the laser scanner being mounted on the carriage is movable, as a whole, between the different centers, relative to the reference surface.

2. Device according to claim 1, characterized in that the optical measuring device is provided with at least one optical element being orientated to the reference surface.

3. Device according to claim 1, characterized in that the optical measuring device bears against the reference surface.

4. Device according to claim 1, characterized in that the optical measuring device, during or after the scan, is connected, by means of a cable and an interface or via radio, to the control and evaluation unit or to an external evaluation unit.

5. Device according to claim 1, characterized in that the optical measuring device or a data memory of the optical measuring device, after registering the whole scene, is connected to the control and evaluation unit or to an external evaluation unit.

6. Device according to claim 1, characterized in that the optical measuring device comprises a sensor, which registers, at regular intervals, data from the reference surface, and a computing unit, which compares the registered data with each other and which, by virtue of the differences, particularly by determining the optical flow, computes the movement of a scanner mouse relative to the reference surface.

7. Device according to claim 6, characterized in that the optical measuring device comprises a light source, for example an LED or a laser, which emits light onto the reference surface, wherein the sensor takes pictures of the irradiated reference surface.

8. Device according to claim 7, characterized in that the light source, the sensor and the computing unit are mounted on a common printed board or are integrated in a common module/chip.

9. Device according to claim 1, characterized in that further measuring devices are assigned to the laser scanner, the data of which measuring devices are to be joined together with the data of the laser scanner and, if necessary, in advance with the data of the optical measuring device, and be evaluated.

10. Method for optically scanning and measuring a scene, using a device according to claim 1, wherein the scene is registered by means of different scans which are partially overlapping within a range of measuring points and wherein the laser scanner, for every scan having a certain center, is moved to a certain position, while the optical measuring device registers the path followed by the laser scanner between the different centers.

* * * * *